US006392322B1

(12) United States Patent
Mares et al.

(10) Patent No.: US 6,392,322 B1
(45) Date of Patent: May 21, 2002

(54) RUGGED EXPLOSION-PROOF ACTUATOR WITH INTEGRAL ELECTRONICS

(75) Inventors: E. Joseph Mares, Del Mar; Ronald Zawistowski, Carlsbad; Daniel R. Clark, San Diego, all of CA (US)

(73) Assignee: Precision Engine Controls Corporation, San Diego, CA (US)

( * ) Notice: Subject to any disclaimer, the term of this patent is extended or adjusted under 35 U.S.C. 154(b) by 0 days.

(21) Appl. No.: 09/494,919

(22) Filed: Jan. 31, 2000

(51) Int. Cl.[7] ................................................ H02K 5/10
(52) U.S. Cl. ............................. 310/88; 310/89; 310/12
(58) Field of Search .......................... 310/88, 89, 91, 310/60 A, 67 R, 12, 13, 14

(56) References Cited

U.S. PATENT DOCUMENTS

| | | | | |
|---|---|---|---|---|
| 2,863,512 A | * | 12/1958 | Mansfield | 169/1 |
| 3,562,405 A | * | 2/1971 | Ashford | 174/65 |
| 3,965,761 A | | 6/1976 | Stanley | 74/89.15 |
| 4,094,361 A | * | 6/1978 | Yago | 169/48 |
| 4,215,330 A | * | 7/1980 | Hartman | 335/306 |
| 4,496,865 A | | 1/1985 | Allen et al. | 310/80 |
| 4,557,225 A | * | 12/1985 | Sagues et al. | 123/41.31 |
| 4,608,912 A | | 9/1986 | Navarette | 92/5 R |
| 4,882,459 A | | 11/1989 | Edwards, Jr. et al. | 200/83 J |
| 4,891,994 A | | 1/1990 | Barba | 74/2 |
| 4,922,159 A | * | 5/1990 | Phillips et al. | 318/128 |
| 4,955,535 A | | 9/1990 | Tsutsui et al. | 236/12.12 |
| 4,984,745 A | * | 1/1991 | Akeel et al. | 239/587 |
| 4,985,653 A | * | 1/1991 | Takagi et al. | 310/88 |
| 5,084,645 A | * | 1/1992 | Collins et al. | 310/309 |
| 5,111,708 A | | 5/1992 | Brusasco | 74/89.15 |
| 5,285,998 A | | 2/1994 | Zink et al. | 251/144 |
| 5,333,989 A | | 8/1994 | Missana et al. | 415/17 |
| 5,390,651 A | | 2/1995 | Nussbaum et al. | 123/694 |
| 5,598,043 A | | 1/1997 | Hirano et al. | 310/12 |
| 5,625,168 A | | 4/1997 | Van Siclen, Jr. | 174/102 R |
| 5,689,994 A | | 11/1997 | Nagai et al. | 74/89.15 |
| 5,713,336 A | | 2/1998 | King et al. | 123/525 |
| 5,774,968 A | | 7/1998 | Givler | 29/243.54 |
| 6,005,310 A | * | 12/1999 | Mosciatti et al. | 310/12 |

* cited by examiner

Primary Examiner—Nick Ponomarenko
Assistant Examiner—Thanh Lam
(74) Attorney, Agent, or Firm—Wells St. John P.S.

(57) ABSTRACT

An explosion-proof actuator assembly includes an explosion-proof housing, a motor, motor control electronics, and an actuator. The housing has at least one inner cavity and at least one exit path comprising an explosion-proof flame path. The motor is disposed within the housing. The motor control electronics communicate with the motor and are disposed within the housing. The actuator is carried by the housing, communicates with the motor, and is configured for movement relative to the housing responsive to actuation of the motor.

32 Claims, 10 Drawing Sheets

RUGGED EXPLOSION-PROOF ACTUATOR WITH INTEGRAL ELECTRONICS

TECHNICAL FIELD

This invention pertains to electric motors and actuators. More particularly, this invention relates to unitary electric motor and actuator assemblies having explosion-proof construction that facilitates use in explosive gas environments.

BACKGROUND OF THE INVENTION

The construction and utilization of linear and rotary actuators is well understood. For example, electromechanical actuators have included hydraulic actuators, pneumatic actuators, and ball-screw actuators. For various reasons discussed below, none of the prior art linear actuators are suitable for use in applications where there is a potentially explosive environment, and where there is limited package space. For example, none of the prior art devices are suitable for driving a fuel and air delivery valve for a gas turbine engine where there is limited package space, and the actuator requires precision actuation within a potentially explosive environment. It is believed that other similar applications exist where there is a need for a limited package space actuator that can operate within a potentially explosive environment.

Hydraulic linear actuators are well known in the art. Typically, a hydraulic actuator is actuated via an arrangement of hydraulic valves to impart axial movement of an actuator rod. The actuator rod is used to impart movement to a mechanical component such as a kinematic linkage on a machine. However, the ability to precisely control movement is somewhat limited to the ability to accurately control fluid flow via the hydraulic valves. Furthermore, hydraulic fluid tends to leak from the actuator, particularly over time as seals within the actuator wear during use. Even furthermore, the hydraulic actuator and control valves are provided as separate components which tends to prevent use where package space is limited.

Pneumatic linear actuators are also well known in the art. Typically, a pneumatic actuator is actuated via a supply of pressurized gas via a pneumatic valve assembly. Similar to a hydraulic actuator, the pneumatic actuator has a rod that imparts movement to a mechanical component. Also similar to the hydraulic actuator, the pneumatic actuator and pneumatic valve assembly are provided as separate components which tends to prevent use where package space is limited.

Rotary threaded shaft actuators are additionally well known in the art. Examples of such actuators include ball screw actuators, and improvements on such actuators that use some form of modified nut and threaded shaft to generate linear actuation. Examples includes U.S. Pat. Nos. 3,965,761 and 4,496,865, herein incorporated by reference. A rotary motor generates rotational motion that is converted into linear motion with the aid of a linear traveling device such as a threaded shaft cooperating with a threaded nut assembly. However, an electric motor having a permanent magnetic field is used to drive these threaded shaft actuators. Use of such electric motors tends to be somewhat imprecise for applications that require precise axial movement, such as is used when metering fuel and air delivery via a valve assembly for a turbine engine. Furthermore, such electric motors are typically DC motors that include motor brushes. However, such brushes are known to generate sparks which can be hazardous when using the actuator within a potentially explosive environment.

Recent advances have been made in the field of brushless DC motors. However, such motors require the use of a computer controller in order to precisely control operation of the brushless motors, and such computer controllers increase the packaging size and complexity. Additionally, the control electronics are typically provided on one or more printed circuit boards which provide an additional source for generating a spark that could prove dangerous when used in a potentially explosive environment. Furthermore, these motors have only been provided in housings that are separate from a linear actuator that is driven by the motor. Hence, the package space is relatively bulky.

Accordingly, there exists a need for a motorized actuator that is compact and suitable for use in potentially explosive environments, such as for operating fuel and air delivery valves for gas turbine engines.

SUMMARY OF THE INVENTION

A rugged explosion-proof actuator is provided with onboard electronics and a precise brushless DC motor. Explosion-proof functionality is imparted via one or more gas exit paths designed to impart explosion-proof flame paths within a single, relatively compact and unitary actuator and motor housing. According to one construction, the actuator is a linear actuator. According to another construction, the actuator is a rotary actuator.

According to one aspect of the invention, an actuator assembly includes an explosion-proof housing, a motor and an actuator. The housing has an inner cavity. The motor is disposed within the housing. The actuator is carried by the housing and communicates with the motor. The actuator is operative to generate movement externally of the housing responsive to actuation of the motor.

According to another aspect of the invention, an actuator assembly includes a housing, a motor, motor control electronics, and an actuator. The housing has an inner cavity. The motor is disposed within the housing. The motor control electronics communicate with the motor and are disposed within the housing. The actuator is carried by the housing and communicates with the motor. The actuator is carried for movement relative to the housing responsive to actuation of the motor.

According to yet another aspect of the invention, an explosion-proof actuator assembly includes an explosion-proof housing, a motor, motor control electronics, and an actuator. The housing has at least one inner cavity and at least one exit path comprising an explosion-proof flame path. The motor is disposed within the housing. The motor control electronics communicate with the motor and are disposed within the housing. The actuator is carried by the housing, communicates with the motor, and is operative to generate movement externally of the housing responsive to actuation of the motor.

BRIEF DESCRIPTION OF THE DRAWINGS

Preferred embodiments of the invention are described below with reference to the accompanying drawings, which are briefly described low.

FIG. 13 is a second perspective view of the actuator of FIG. 2 illustrating the heat dissipating cover and electronics removed from the actuator housing.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Reference will now be made to a preferred embodiment of Applicant's invention. One exemplary implementation is described below and is depicted with reference to the drawings comprising an explosion-proof linear actuator having onboard electronics, a brushless DC drive motor, and an integrated actuator contained within a relatively compact, unitary housing. While the invention is described via a preferred embodiment, it is understood that the description is not intended to limit the invention to this embodiment, but is intended to cover alternatives, equivalents, and modifications such as are included within the scope of the appended claims. For example, it is envisioned that an explosion-proof rotary actuator can also be provided according to an alternative construction.

In an effort to prevent obscuring the invention at hand, only details germane to implementing the invention will be described in great detail, with presently understood peripheral details being incorporated by reference, as needed, as being presently understood in the art.

Figure 1:
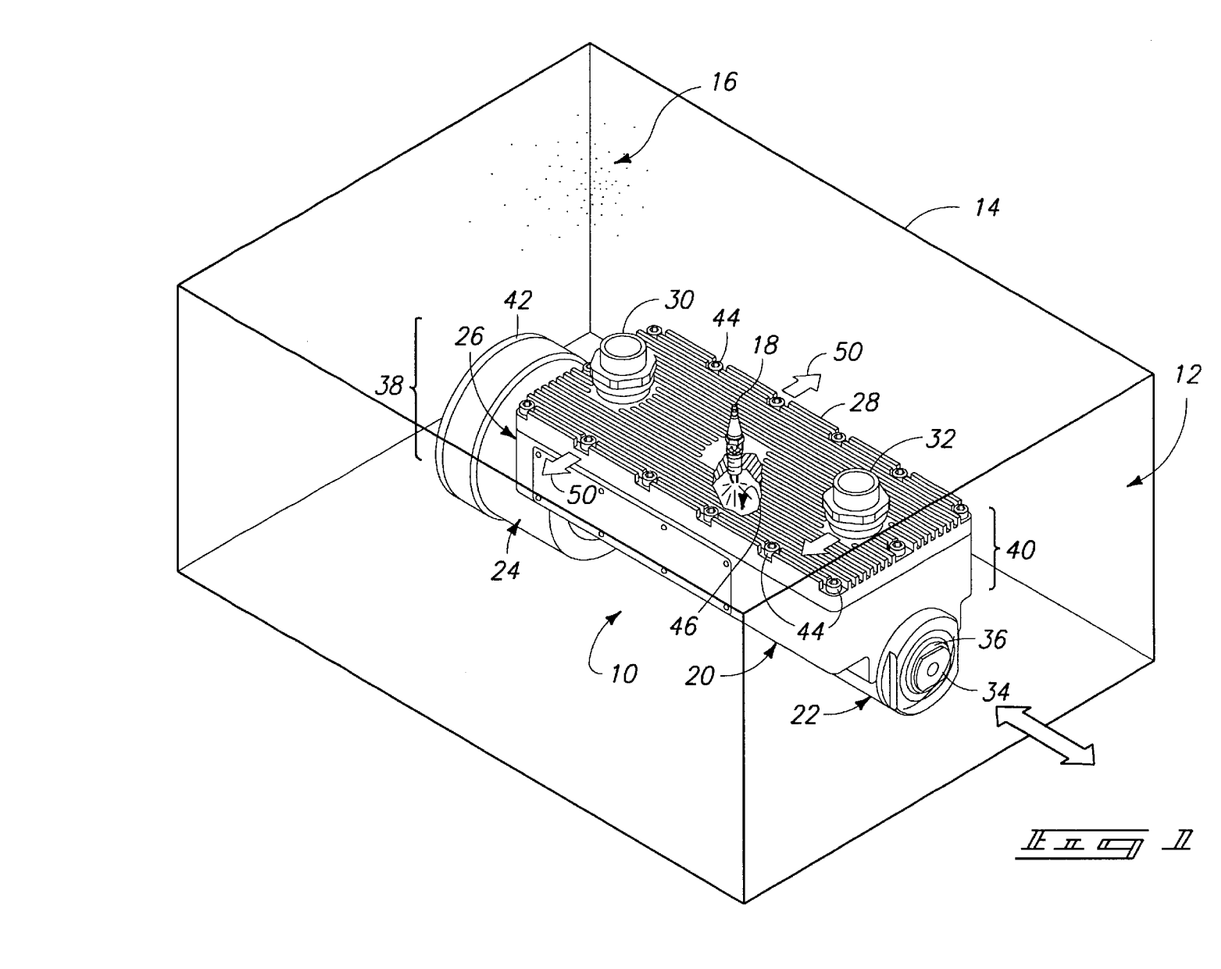
FIG. 1 is an isometric view of a rugged explosion-proof actuator illustrating a test environment for testing explosion-proof capabilities within an enclosed test chamber.

A preferred embodiment of the invention is illustrated in the accompanying drawings particularly showing a rugged explosion-proof electric/electronic linear actuator assembly suitable for use in potentially explosive environments and generally designated with reference numeral in FIGS. 1–7 and 13. In FIG. 1, self-contained linear actuator assembly 10 is shown supported within a test environment for testing explosion-proof capabilities. More particularly, linear actuator assembly 10 is contained within an enclosed test chamber 12 provided within a metal containment box 14. Chamber 12 is filled with explosive gases 16 such as hydrogen gas which migrates inside actuator assembly 10. During a test phase, an ignition source, such as a spark plug, 18 is provided to ignite explosive gases that are present within actuator assembly 10.

The utilization of electrical and electronics equipment in hazardous areas where there is a risk of explosion has necessitated the rendering of explosion-proof equipment. However, much of the equipment available to-date has been bulky and poorly designed for specific applications such as on a linear actuator assembly being used to control a fuel/air delivery valve on a gas turbine engine. Oftentimes, motors and electronics are placed inside commercially available explosion-proof enclosures which are bulky, and poor at accommodating actuators and wiring systems. Applicant's invention addresses the need for a unitary and compact motor/actuator assembly, as well as the need for an explosion-proof linear actuator assembly.

Actuator assembly 10 is designed to provide local containment of explosion energy and flame in order to prevent an internal explosion generated by electrical/electronics device contained therein from providing an ignition source for an external explosion. The expulsion of hot gases from the housing of actuator assembly 10 is controlled such that surface temperatures, flames, and gas temperatures are reduced sufficiently so as to prevent the ignition of flammable gases present outside of the housing. As a result, any internal explosion that is generated within actuator assembly 10 does not expose the surrounding environment to a possible ignition source.

As will be described below in greater detail, Applicant's design overcomes the relatively expensive, heavy, and cumbersome solutions that would be provided by combining known explosion-proof enclosures with available linear actuators and separate drive motor assemblies.

In order to impart successful explosion-proof characteristics, a housing 20 of actuator assembly 10 incorporates flame paths such as flame paths 50 (see FIGS. 7–12 for additional flame paths 48–49 and 51–54) which allow for safe passage of hot gases and explosive energy from within housing 20. The hot gases and explosive energy is transferred into chamber 12 from within housing 20 so as not to ignite explosive gases 16 contained inside chamber 12 and outside actuator assembly 10.

More particularly, housing 20 is designed for utilization in hazardous locations such as in known explosive environments. The integration of motor 24 and associated control electronics (not shown) of electronics package 26 within a unitary housing 20 increases the risk for a spark-induced explosion. First, there is a risk of explosion resulting from sparks emanating from the control electronics. Secondly, there is a risk of explosion resulting from sparks emanating from motor 24, even though the risk is reduced since motor 24 comprises a brushless motor.

Housing 20 is designed with flame paths, such as flame paths 50, in order to sufficiently contain any explosion that occurs within an inner cavity, such as electronics cavity 46, of housing 20. Containment is realized when flame paths enable the dissipation of energy and heat sufficiently from inside housing 20 such that transmission of energy and flame to the outside of housing 20 is insufficient to ignite an explosion externally of housing 20. More particularly, each flame path is of sufficient length to dissipate energy generated during an internal explosion so as to prevent generation of an explosion outside of housing 20.

Each flame path comprises a slight design gap provided between mating parts of housing 20. Such gaps enable release of heat and energy from housing 20 during an internal explosion, while containing the explosion therein and preventing transmission of flames outside of housing 20. Even where there is no visible gap between mating parts, a gap still exists unless a hermetic seal has been formed therebetween. Further details of specific flame paths are described in greater detail below with reference to FIGS. 7–12.

Housing 20 is designed to meet several explosion-proof standards, including the National Electrical Code (NEC) standard, Article 500, in the United States; Canadian Standard 22.2-139 for electrically operated equipment which includes Canadian Standards Association (CSA) Class 1, Division 1, Group B (hydrogen) rating; and European Cenetec design standard EN50014 which includes European Explosion-Proof rating EEx IIB.

Based on Applicant's understanding, there has never previously been a motor that has passed the flame test for Canadian Standards Association (CSA), Class 1, Division 1, Group B (hydrogen). A recent test was conducted utilizing a prototype actuator assembly constructed according to the assembly depicted herein and identified as actuator assembly 10 in the accompanying figures. Such prototype actuator is the first known actuator having an integral motor that has passed the flame test for CSA Class 1, Division 1, Group B, based upon Applicant's knowledge.

As shown in FIG. 1, actuator assembly 10 is tested in an air and fuel environment where gases 16 comprise a mixture of hydrogen and air. A threaded hole is drilled through a heat sink cover 28, and a spark plug 18 is threaded into the hole such that a test spark can be introduced into inner cavity 46. Sufficient threads are provided therebetween so as to provide a flame path during testing. Optionally, an air and nitrogen mixture of gas can be provided within inner cavity 46. A series of explosions are carried out within inner cavity 46 by generating sparks with spark plug 18 to ensure that an external explosion is not generated in test chamber 12.

It should be noted that apparatus 10 is very compact because housing 20 is constructed as a unitary assembly which contains linear actuator 22, motor 24, and electronics package 26 in a single, common assembly. More particularly, housing 20 is formed by joining together an actuator/motor housing subassembly 38 and an electrical housing subassembly 40. Both actuator/motor housing subassembly 38 and electrical housing subassembly 40 contain joints that are explosion-proof, using flame joints where components connect together. Every penetration of housing 20 requires the protection provided by flame path designed joints. In combination, such subassemblies 38 and 40 also provide a space-minimized design.

Figure 4:
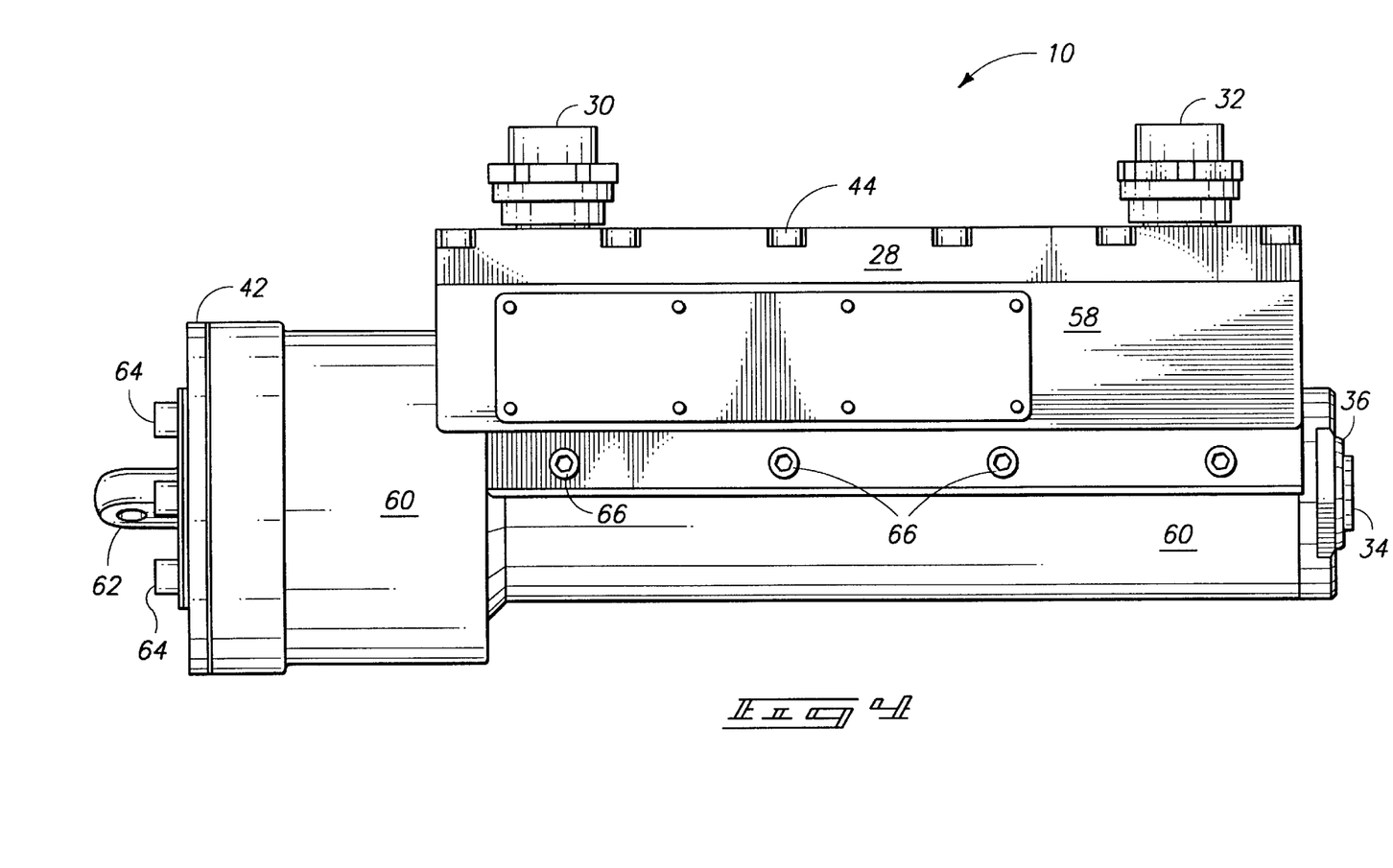
FIG. 4 is a front elevational view of the apparatus illustrated in FIGS. 1–3.
Figure 5:
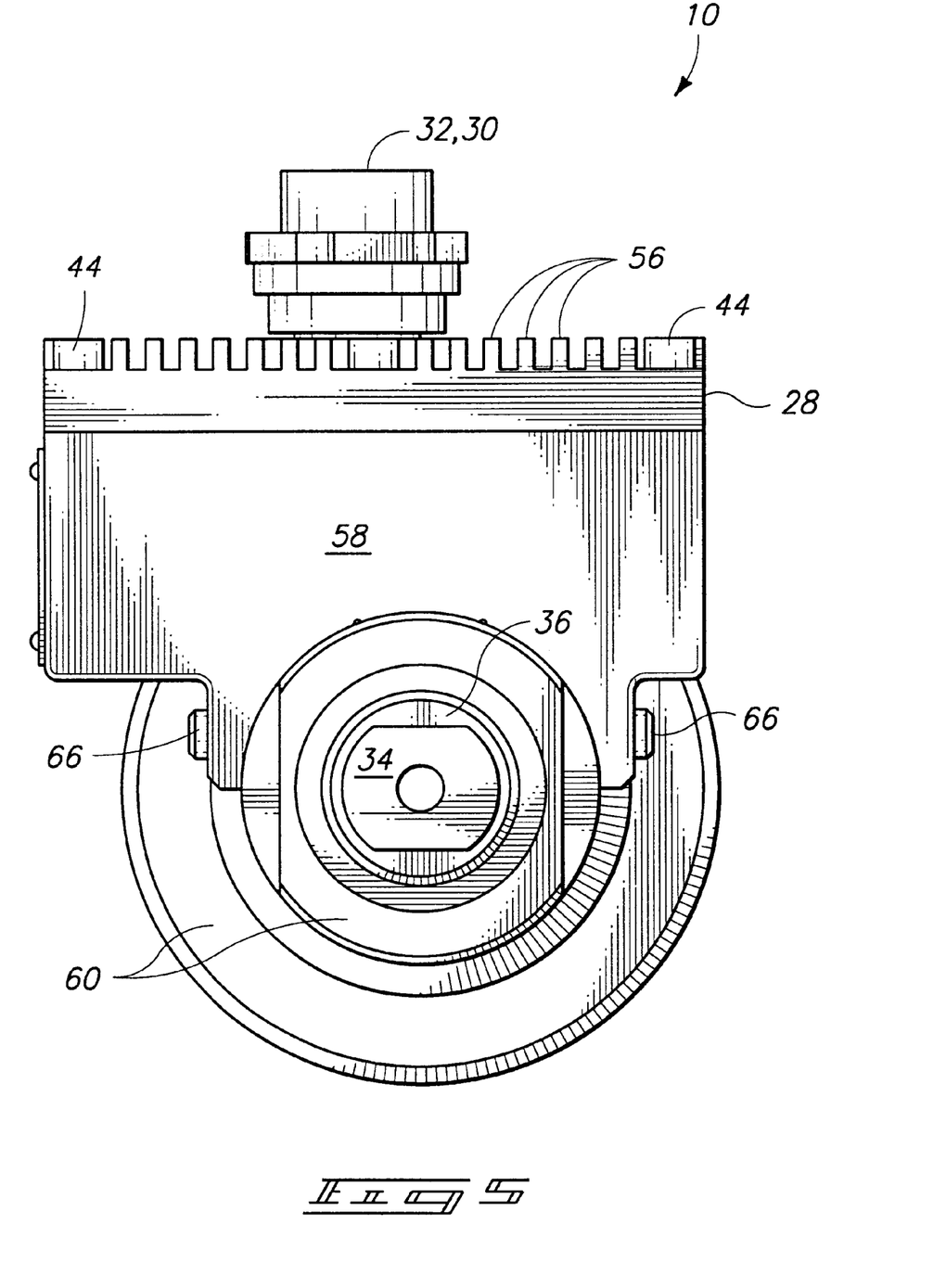
FIG. 5 is a right side view taken from the right of FIG. 4.
Figure 6:
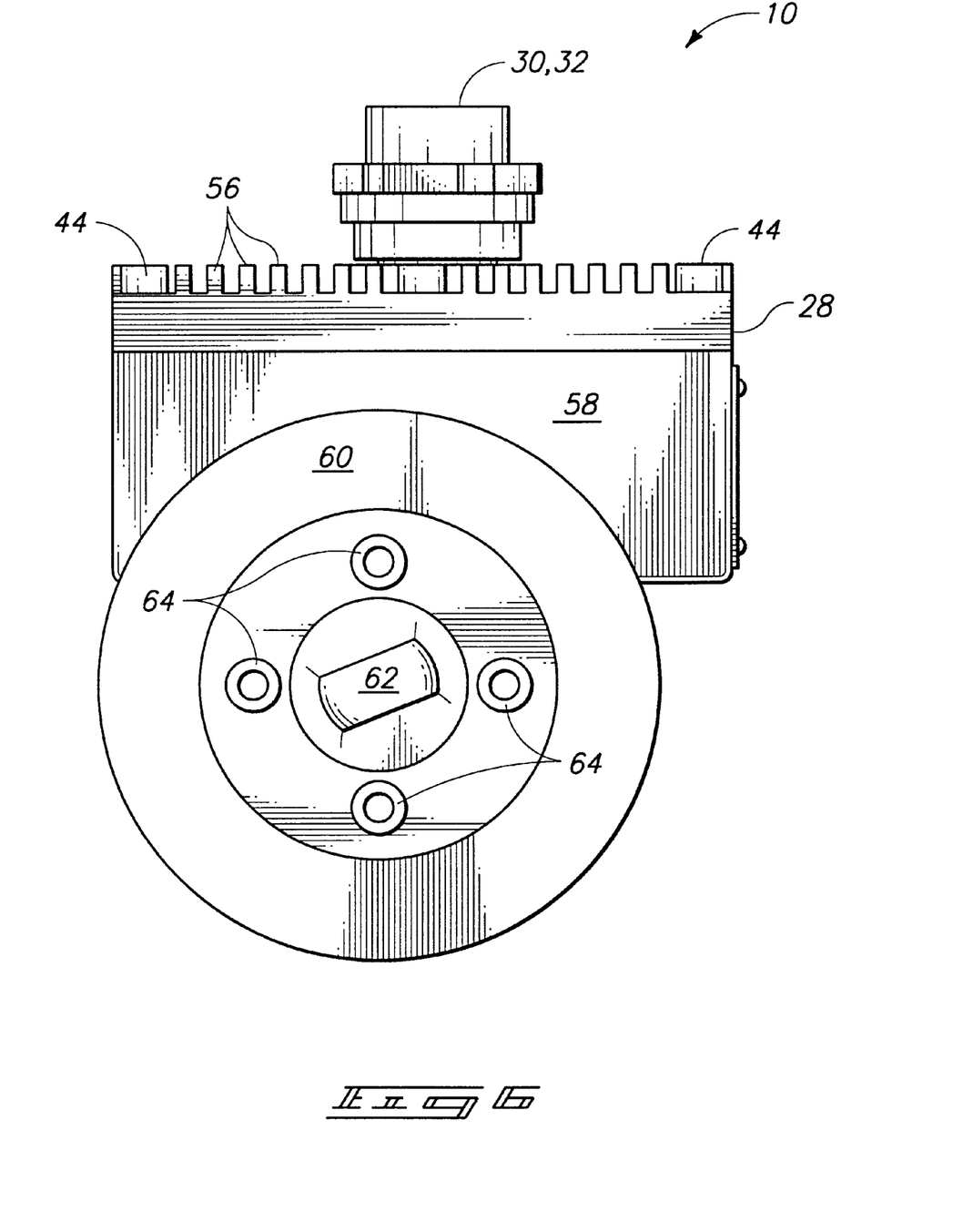
FIG. 6 is a left side view taken from the right of FIG. 4.

As shown in FIGS. 4 and 5, actuator/motor housing subassembly 38 is secured to electrical housing subassembly 40 via a plurality of threaded fasteners 66. Actuator/motor housing assembly 38 forms an inner cavity 100 inside of which motor 24 and linear actuator 22 are contained. Electrical housing subassembly 40 forms a similar inner cavity 46 inside of which electronics are contained in the form of a first printed circuit (PC) board 68 and a second printed circuit (PC) board 70.

Figure 7:
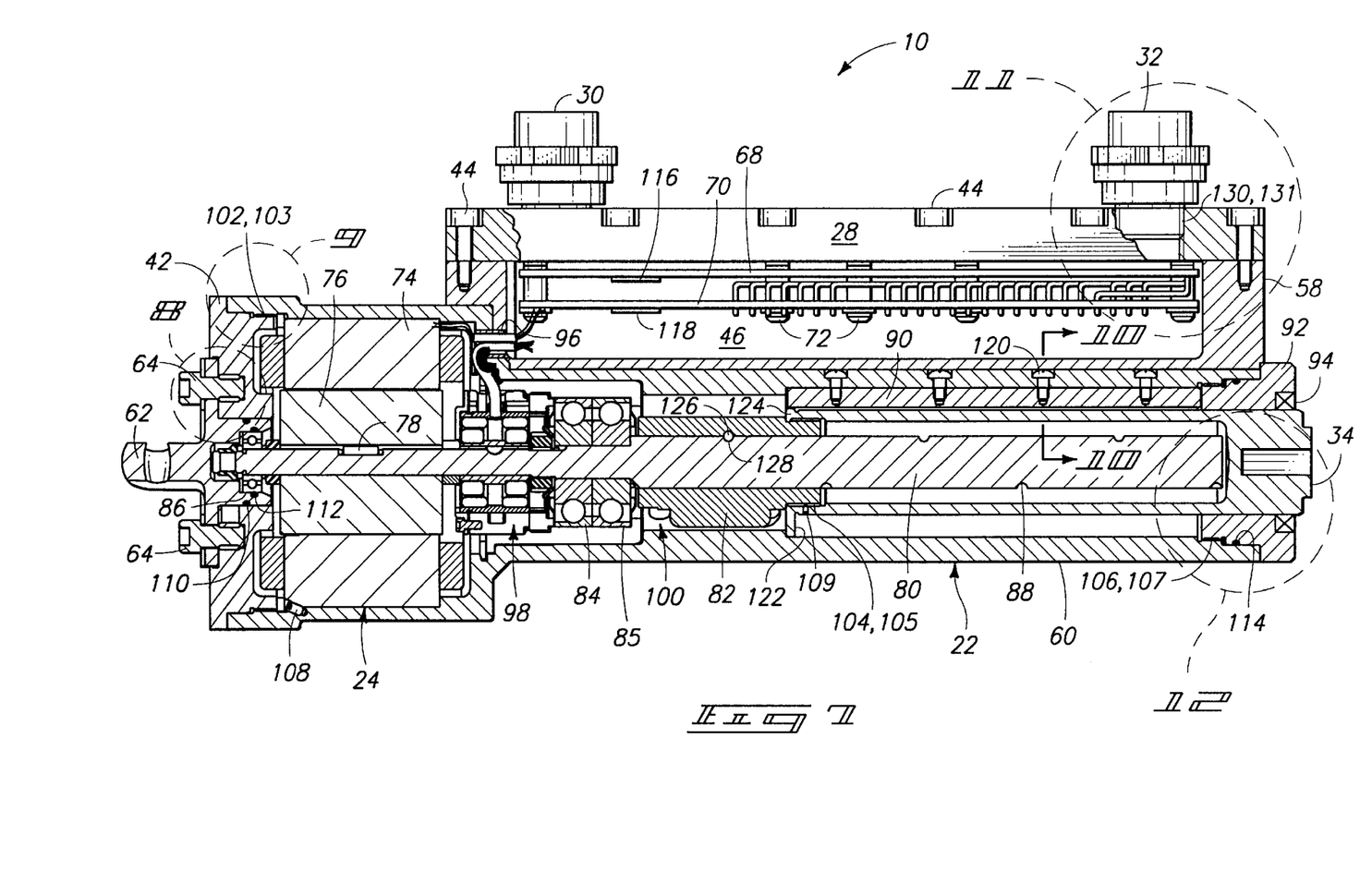
FIG. 7 a vertical sectional view taken along the central axis of the actuator of FIGS. 1–6.

Cavities 46 and 100 are coupled together via a metal ferrule 96 as shown in FIGS. 7 and 13. Ferrule 96 is welded into place with a continuous circumferential weld at each end to an electronics tray 58 of electrical housing assembly 40 and an actuator/motor casing 60 of actuator/motor housing assembly 38. As a result, the internal cavities 46 and 100 of housing assemblies 40 and 38, respectively, are hermetically joined together by ferrule 96 which is completely welded therebetween. Hence, the need for a flame path between assemblies 38 and 49 is eliminated. However, all other mechanically fastened-together connections associated with housing 20 and cavities 46 and 100 require the utilization of flame paths 48–54 as described below in greater detail.

As shown in FIGS. 2–7, electrical housing subassembly 40 comprises electronics tray 58 and heat sink cover 28.

Tray 58 is secured to cover 28 via a plurality of threaded fasteners 44 so as to define inner cavity 46 therebetween. A flame path 51 is provided between cover 28 and tray 58 as will be identified below with reference to FIGS. 7 and 11.

Cover 28 is formed from aluminum: so as to provide a heat sink that draws heat from electrical/electronic components contained within housing 20 and rejects the heat to gases outside of housing 20. More particularly, cover 28 includes a plurality of integrally-formed cooling vanes, or fins, 56 provided on an outer surface. Electronics, or PC boards 68 and 70, are mounted directly onto an inner surface of cover 28 via fasteners 72 (of FIG. 7). In operation, electronics of PC boards 68 and 70, such as a motor driver 116 and a programmable logic controller (PLC) 118, generate heat within inner cavity 46. Such generated heat is then transferred from inner cavity 46 through cover 28 where the heat is dissipated externally of housing 20 via cooling vanes 56.

Figure 11:
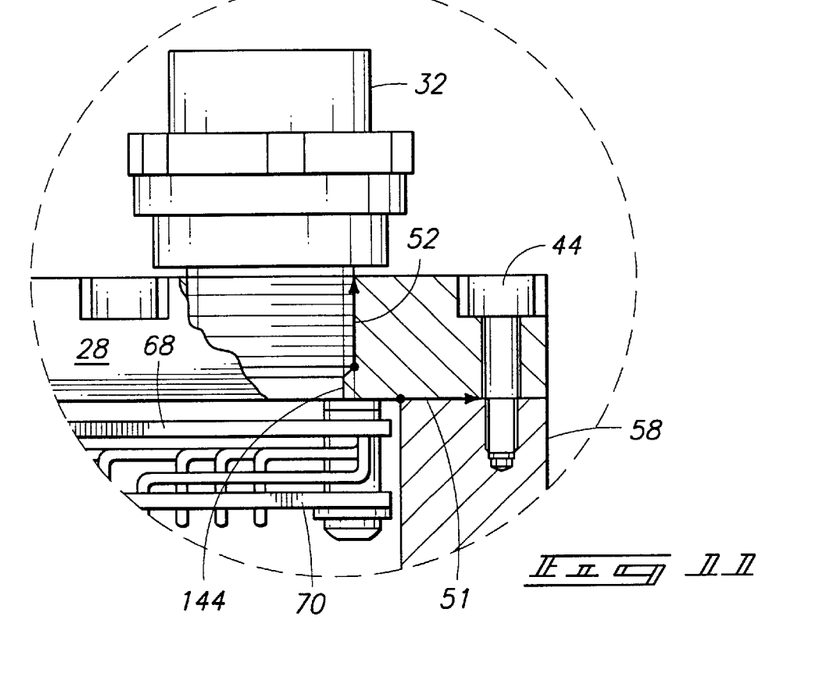
FIG. 11 is an enlarged sectional view taken from the identified encircled region of FIG. 7 illustrating fourth and fifth flame paths.

A pair of wire feed through couplings, or fittings, 30 and 32 are mounted within cover 28. As shown in FIG. 7, feed through coupling 32 includes threads 130 that mate in threaded engagement with corresponding threads 131 formed within individual bores 144 (see FIG. 11) formed through cover 28. A similar set of threads 130 and 131 are provided for mating feed through coupling 30 with cover 28. As shown in FIG. 11 below, a sufficiently threaded flame path 52 is formed by threads 130 and 131 along both of feed through couplings 30 and 32.

As shown in FIG. 13, wire feed through fitting 30 contains four fourteen gauge, 120 Volt power wires 146 that are potted within fitting 30 via epoxy. Accordingly, wires 146 pass through cover 28 via fitting 30 in a sealed manner. Similarly, wire feed through fitting 32 contains seventeen twenty gauge wires 148 that carry digital signals such as command signals and alarm signals, and which are potted within fitting 32 via epoxy. Accordingly, wires 148 also pass through cover 28 where they are sealed within fitting 32.

As shown in FIGS. 2–7, actuator/motor housing subassembly 40 comprises actuator/motor casing 60 and motor cover 42. Motor cover 42 is secured to actuator/motor casing 60 via threads 102 formed on cover 42 and corresponding mating threads 103 formed within casing 60. Cover 42 and casing 60 cooperate to form inner cavity 100 in which motor 24 and linear actuator 22 are contained. As will be described below in greater detail with reference to FIG. 9, a flame path 49 is provided outboard of threads 102 and 103.

Figure 2:
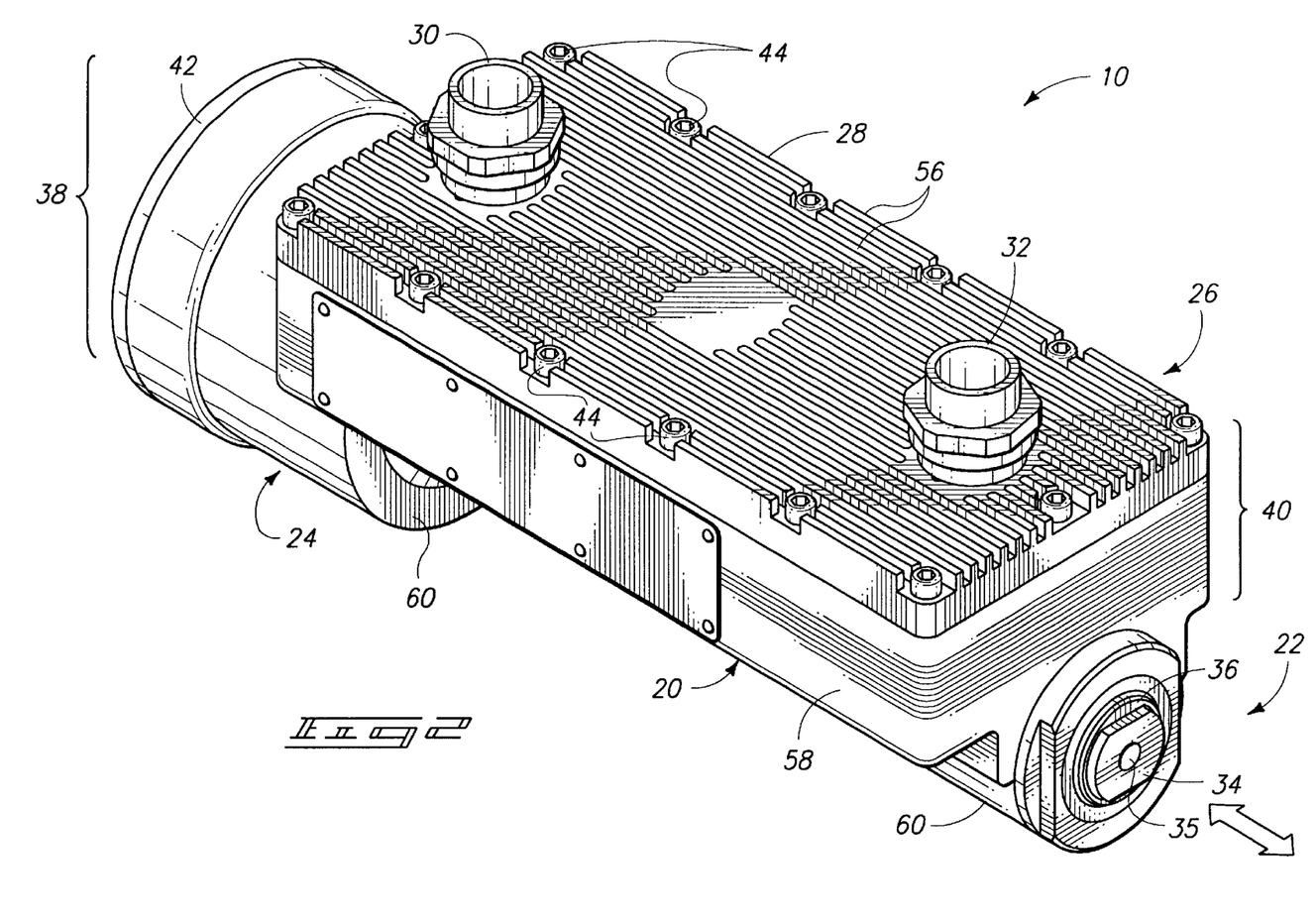
FIG. 2 is an enlarged isometric view of the rugged explosion-proof actuator illustrated in FIG. 1 according to one aspect of the invention.
Figure 3:
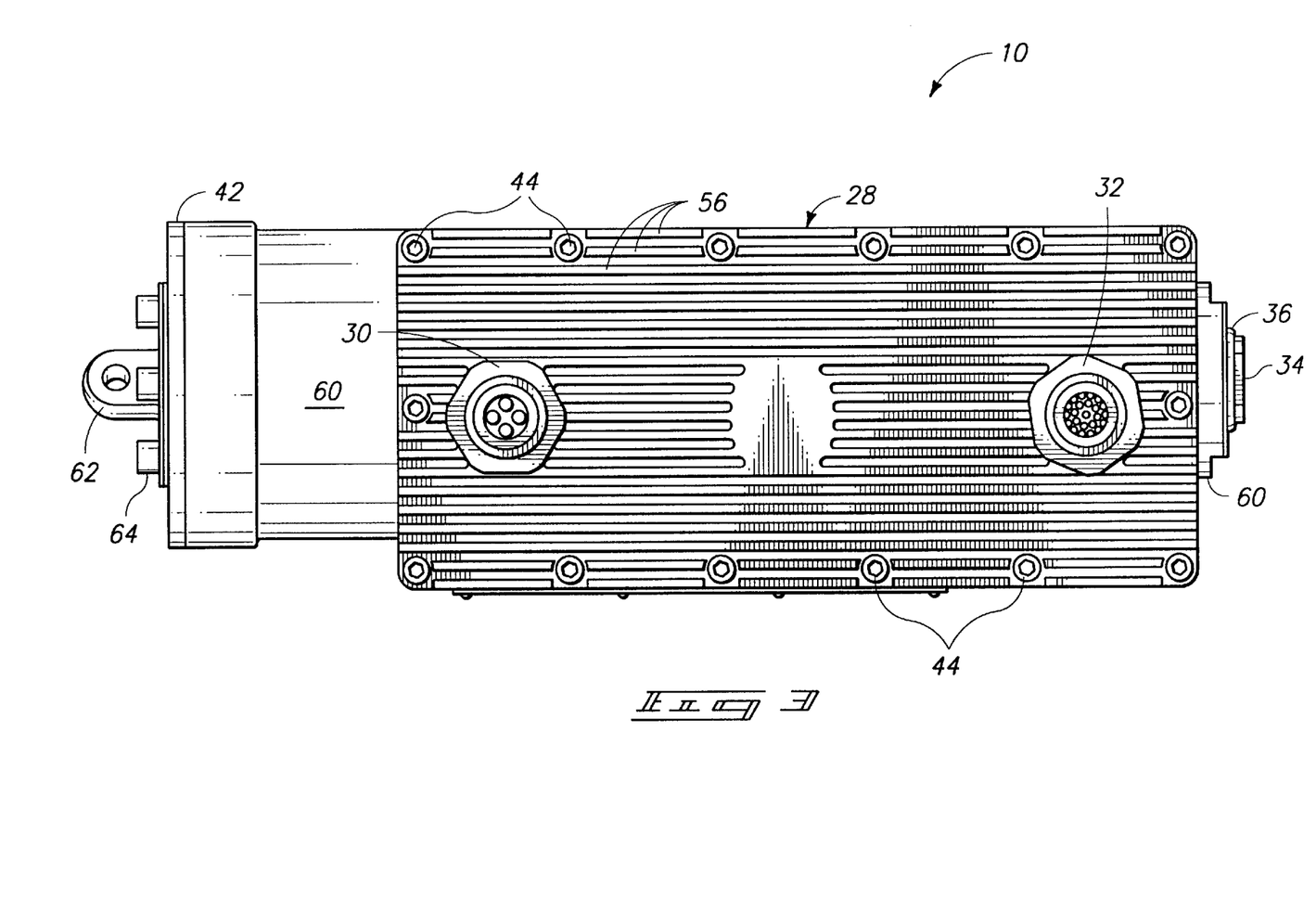
FIG. 3 is a plan view of the actuator illustrated in FIGS. 1 and 2.

According to FIGS. 2, 5, and 7, an actuator rod 34 extends from housing 20 of linear actuator assembly 10. Actuator rod 34 is driven for accurate axial displacement from housing 20 through a rod end bearing 36. A threaded bore 35 is provided within the exposed end of actuator rod 34. According to one application, linear actuator assembly 10 is connected to a valve assembly in order to open and close a fuel and air delivery valve (not shown) for delivering fuel and air to a gas turbine engine. Threaded bore 35 is configured to receive a threaded rod that drives the valve assembly.

As shown in FIGS. 3, 4, 6, and 7, a clevis 62 is provided for securing linear actuator assembly 10 to a rigid support member. Accordingly, clevis 62 affixes linear actuator assembly 10 at one end, while actuator rod 34 is driven in accurate axial displacement via motor 24, linear actuator 22, and electronics package 26 so as to actuate a device, such as a valve assembly (not shown).

Clevis 62 is secured to motor cover 42 via four threaded clevis bolts 64 as shown in FIGS. 3, 4, 6, and 7. A circumferential seal 110 is provided between clevis 62 and motor cover 42. A flame path 48 is formed between clevis 6 and motor cover 42, outboard of seal 110, as describe below in greater detail with reference to FIG. 8.

As shown in FIG. 7, motor 24 comprises a brushless DC rotary motor having a stator 74 and a rotor 76. Stator 74 is affixed in a stationary location within actuator/motor casing 60 via a locking pin 108. Rotor 76 is affixed to a ball screw shaft 80 via an anti-rotation key 78. Ball screw shaft 80 communicates with a ball screw nut 82 which rides along a helical groove 88 along shaft 80 via spherical ball bearings 128 that are contained within a raceway (not shown) within nut 82.

In operation, power is supplied to stator 74 of motor 24 which causes rotor 76 and ball screw shaft 80 to rotate together as a unit. Rotation of ball screw shaft 80 causes nut 82 to translate axially along shaft 80 via coaction of balls 128 in groove 88. Balls 128 are recirculated within a raceway or groove 126 that is formed in nut 82. Details of the operation which converts rotary motor motion into axial actuator rod motion are generally well understood in the art of ball screw actuators, and linear actuator 22 comprises such a ball screw actuator. U.S. Pat. No. 5,111,708 describes one such construction, and is herein incorporated by reference.

According to one construction, motor 24 comprises a frame-less, brushless DC motor. One such motor suitable for use in linear actuator assembly 10 of FIG. 7 is an RBE Series motor presently commercially available from Kollmorgen Motion Technologies Group, 501 First Street, Radford, Va. 24141.

In operation, electrical amplifier signals are generated by motor driver PC board 68 and delivered to brushless motor 24. Rotary motion of rotor 76 is generated as motor 24 converts the electrical amplifier signals into torque. A motor power supply and drive amplifier (not shown) are provided on driver board 68.

Additionally, a feedback device in the form of a resolver 98 is provided for monitoring position and velocity of rotor 76 and ball screw shaft 80. The values detected by resolver 98 are then compared with command input values provided on digital logic PC board 70. A servo amplifier on board 68 is used to adjust electrical output to motor 24 in order to realize command input requirements. Precise motion control for shaft 80 (and actuator rod 34) is obtained using position, velocity current, and control loops. Accordingly, resolver 98 is mounted at a stationary location about ball screw shaft 80 in order to sense rotational position information of shaft 80.

Resolver 98 includes a stator and a rotor. An excitation signal is sent to resolver 98 from digital logic board 70. Such an excitation signal in the form of a sine or cosine signal tells when to turn on the next phase for the three phases of motor 24.

As shown in FIG. 7, rotor 76 includes a plurality of high energy magnets. Stator 74 has three phases spaced in 120 degree increments around the motor. Resolver 98, in operation, provides velocity feedback information as well as position information that is used to commutate motor 24. Additionally, position loops can be realized via resolver 98.

In FIG. 7, ball screw shaft 80 is shown supported for rotation by a single end bearing 86 and a pair of centrally located bearings 84 and 85. Bearing 86 is supported within clevis 62, and a circumferential seal 112 is provided therebetween. Bearings 84 and 85 cooperate to provide a main thrust bearing for shaft 80. Bearings 84 and 85 support all of the thrust generated when driving shaft 80 in rotation, while bearing 86 is primarily provided to stabilize and prevent wobbling of shaft 80.

In operation, nut 82 and actuator rod 34 translate along shaft 80 as shaft 80 is rotated by motor 24. Nut 82 and actuator rod 34 are rigidly affixed together via respective mating threads 104 and 105 and set screw 109. Nut 82 and actuator rod 34 are prevented from rotating with shaft 80 via a slot 124 that is provided within a flange 122 of rod 34. Slot 124 is configured to mate in sliding engagement with an elongate rod guide 90 which prevents any rotation of nut 82 and actuator rod 34. Rod guide 90 is secured to actuator/motor casing 60 via a plurality of threaded fasteners 120.

Actuator rod 34 is further guided for axial reciprocation via a rod end bearing 92 that is rigidly affixed to housing 20 via mating complementary threads 106 and 107, respectively. A circumferential seal/scraper assembly is provided on rod end bearing 92 for mating in sliding and sealing engagement with actuator rod 34. A circumferential o-ring seal 114 is provided between rod end bearing 92 and actuator/motor casing 60, and is carried by rod end bearing 92.

FIGS. 8–12 below depict the construction of flame paths 48–54 which are illustrated as arrows that originate from an initiation point. Each flame path is formed as a flange joint, a spigot joint, or a threaded joint. A flange joint is provided between two mating pieces of machined metal having a small gap of 2/1000's of an inch (2 mils), and requires a minimum flame path length, according to one standard, of at least 3/8". A spigot joint is provided between two mating pieces of metal having a 2 mil gap and a right angle (90 degree) turn, wherein the minimum flame path length of the two mating surfaces is at least 3/8". A threaded joint is provided between two threaded, mating pieces of metal having a plurality of turns comprising at least seven threads no finer than 20 threads per inch (which imparts a thread depth of at least 3/8").

The purpose for realizing the above-detailed joint dimensions, when designing the flame paths, is to ensure that sufficient temperature reduction is imparted to escaping gases that are ejected from the housing of the linear actuator assembly in order that an external explosion is not triggered. Hence, temperature is reduced sufficiently by dissipating energy from the expelled gases as they travel along the flame path. As a result, the expelled gases lose sufficient energy while traveling along the flame paths that the energy (and temperature) is not high enough to ignite any potentially explosive gases present externally of the housing. In essence, the expelled gases are below the auto-ignition temperature of the potentially explosive external gases.

Figure 8:
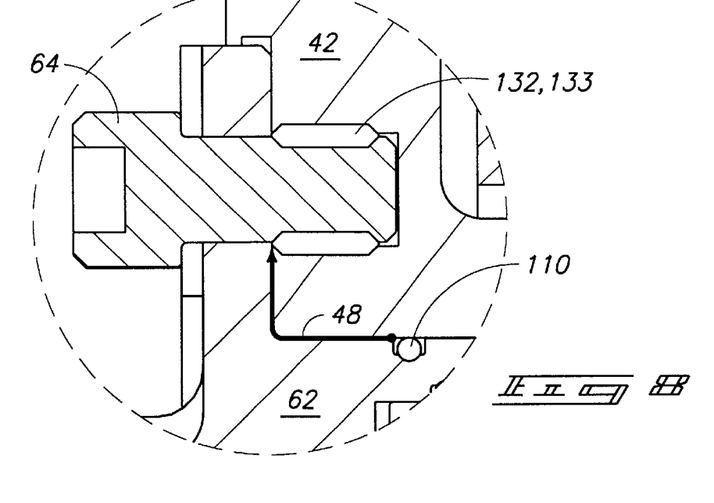
FIG. 8 is an enlarged sectional view taken from the identified encircled region of FIG. 7 illustrating a first flame path.

FIG. 8 is an enlarged sectional view taken from the identified encircled region of FIG. 7 illustrating flame path 48. More particularly, clevis 62 is removably mounted onto motor cover 42 via a plurality of individual threaded fasteners 64. Flame path 48 comprises the shortest, continuous path machined surface formed between clevis 62 and motor cover 42. Flame path 48 is shown extending from seal 110 to fastener 64, and comprises a spigot joint having a total path length (of flat mating surfaces) of 3/8".

Figure 9:
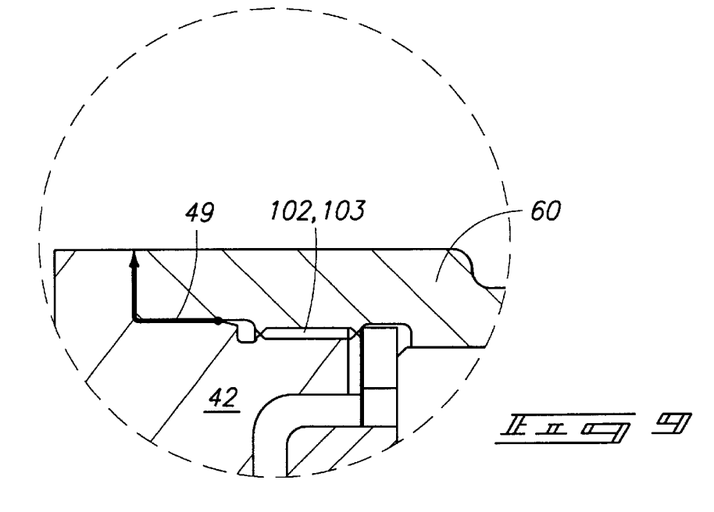
FIG. 9 is an enlarged sectional view taken from the identified encircled region of FIG. 7 illustrating a second flame path.

FIG. 9 is an enlarged sectional view taken from the identified encircled region of FIG. 7 illustrating flame path 49. More particularly, motor cover 42 is removably mated to actuator/motor casing 60 via complementary mating threads 102 and 103, respectively. Flame path 49 comprises a spigot joint that is formed externally of threads 102 and 103, and between motor cover 42 and casing 60. Flame path 49 has a total path length (of flat mating surfaces) of 3/8".

Figure 10:
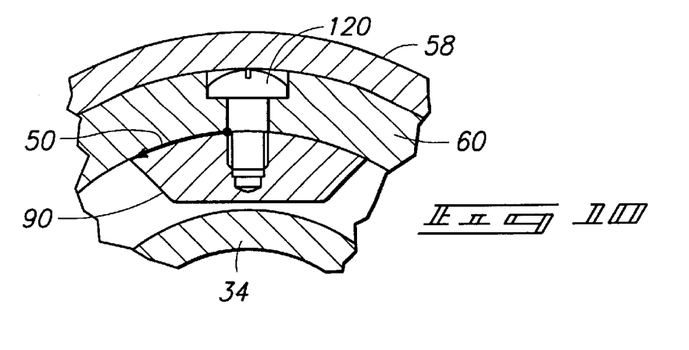
FIG. 10 an enlarged sectional view taken along line 10—10 of FIG. 7 illustrating a third flame path.

FIG. 10 an enlarged sectional view taken along line 10—10 of FIG. 7 illustrating flame path 50. More particularly, mating, machined surfaces on rod guide 90 and actuator/motor casing 60 cooperate to form flame path 50 which comprises a slightly arcuate flange joint therebetween. Such flame path 50 extends for at least 3/8".

FIG. 11 is an enlarged sectional view taken from the identified encircled region of FIG. 7 illustrating flame paths 51 and 52. More particularly, cover 28 mates atop electronics tray 58 via a plurality of threaded fasteners 44 so as to form flame path 51 as a flange joint. Flame path 51 extends at least 3/8" from an inner surface of tray 58 to the outer threads formed in cover 28 and tray 58 for receiving fasteners 44. Additionally, wire feed through fitting 32 is threaded into cover 28 so as to form a threaded joint which provides flame path 52. Flame path 52 is formed between two threaded, mating pieces of metal having a plurality of turns comprising at least, seven mating threads no finer than 20 threads per inch (which imparts a thread depth of at least 3/8"). Flame path 52 extends along the entire mating thread depth provided between cover 28 and fitting 32.

Figure 12:
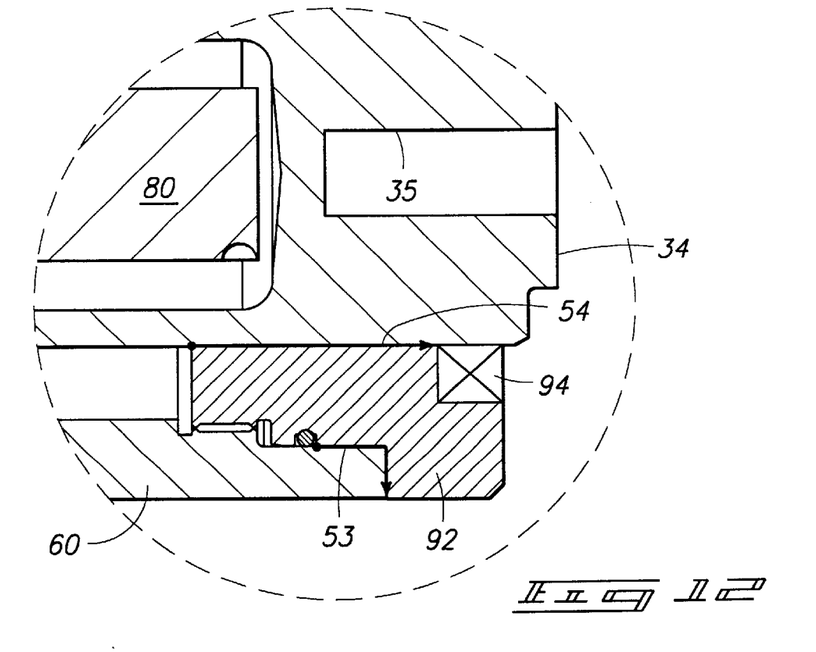
FIG. 12 is an enlarged sectional view taken from the identified encircled region of FIG. 7 illustrating sixth and seventh flame paths.

FIG. 12 is an enlarged sectional view taken from the identified encircled region of FIG. 7 illustrating flame paths 53 and 54. More particularly, flame path 53 comprises a sliding joint that extends between actuator rod 34 and rod end bearing 92 at least 1" in uninterrupted length. Hence, flame path 53 is uninterrupted and extends from the inner edge of rod end bearing 92 to the beginning of scrapper/seal assembly 94. Flame path 54 comprises a spigot joint that extends between actuator/motor casing 60 and rod end bearing 92, and having an uninterrupted flame path length (excluding the right angle bend, but adding together the right angle flat, mating surfaces) of at least 3/8".

FIG. 13 is a second perspective view of the actuator of FIG. 2 illustrating the heat dissipating cover and electronics removed from the actuator housing. The heat dissipating features and relatively compact and unitary construction of linear actuator assembly 10.

One embodiment has been described and depicted above with reference to FIGS. 1–13 for a self-contained linear actuator assembly suitable for use in hazardous, explosion-proof environments such as actuating a fuel/air delivery valve on a gas turbine engine. However, it is understood that such actuator assembly can include a linear and/or rotary actuator, and can be intended for use in less severe environments, such as industrial environments. For example, such actuator assembly can be utilized on industrial gas turbines, or can be used in numerous environments, including environments where there is a danger of explosive factory dust, gas mines, grain elevators, and chemical factories, to name a few. Accordingly, additional desirable embodiments include an industrial high-force actuator, an industrial high-temperature actuator, an actuator having programmable electronics suitable for such environments, and a communications interface-controlled actuator also suitable for such environments.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. An actuator assembly, comprising:
   an explosion-proof housing having an inner cavity and at least one exit path comprising an explosion-proof flame path;
   a motor disposed within the housing; and
   an actuator carried by the housing, communicating with the motor, and operative to generate movement externally of the housing responsive to actuation of the motor.

2. The assembly of claim 1 further comprising motor control electronics communicating with the motor and disposed within the housing.

3. The assembly of claim 2 wherein the actuator comprises a linear actuator communicating with the motor and carried to impart linear movement relative to the housing responsive to actuation of the motor.

4. An actuator assembly, comprising:
   an explosion-proof housing having an inner cavity and at least one exit path comprising an explosion-proof flame path;
   a motor disposed within the housing; and
   an actuator carried by the housing, communicating with the motor, and operative to generate movement externally of the housing responsive to actuation of the motor;
   wherein the actuator comprises an actuator rod extending through the housing, and wherein a flame path is provided between the actuator rod and the housing.

5. An actuator assembly, comprising:
   a housing having an inner cavity and at least one exit path providing an explosion-proof flame path;
   a motor disposed within the housing;
   motor control electronics communicating with the motor and disposed within the housing; and
   an actuator carried by the housing and communicating with the motor, the actuator carried for movement relative to the housing responsive to actuation of the motor.

6. The assembly of claim 5 wherein the actuator comprises a linear actuator communicating with the motor and carried for linear movement relative to the housing responsive to actuation of the motor.

7. The assembly of claim 5 further comprising an electronics heat sink formed by the housing.

8. The assembly of claim 7 wherein the housing comprises an electronics package having an electronics tray and a cover, and wherein the cover provides the heat sink.

9. The assembly of claim 5 wherein the housing comprises an actuator/motor housing subassembly and an electronics housing subassembly, wherein the motor is disposed within a first cavity provided within the actuator/motor housing and the motor control electronics are disposed within a second cavity provided within the electronics housing subassembly.

10. An actuator assembly, comprising;
    a housing having an inner cavity, the housing comprising an actuator/motor housing sub-assembly and an electronics housing sub-assembly;
    a motor disposed within the housing within a first cavity provided within the actuator/motor housing;
    motor control electronics communicating with the motor and disposed within the housing within a second cavity provided within the electronics housing sub-assembly; and
    an actuator carried by the housing and communicating with the motor, the actuator carried for movement relative to the housing responsive to actuation of the motor;
    wherein a ferrule extends between the first cavity and the second cavity such that the first cavity and the second cavity are provided in fluid communication via the ferrule.

11. An actuator assembly, comprising:
a housing having an inner cavity and at least one exit path providing an explosion-proof flame path;
a motor disposed within the housing;
motor control electronics communicating with the motor and disposed within the housing; and
an actuator carried by the housing and communicating with the motor, the actuator carried for movement relative to the housing responsive to actuation of the motor;
wherein the actuator includes an actuator rod extending through the housing, and wherein an explosion-proof flame path is formed between the actuator rod and the housing.

12. The assembly of claim 11 wherein the housing includes a rod end bearing having a scrapper/seal formed between the actuator rod and the rod end bearing, and wherein the flame path is formed between the actuator rod and the housing internally of the scrapper/seal.

13. The assembly of claim 12 wherein the housing includes an actuator/motor casing, the rod end bearing is received in threaded engagement with the casing, and a second flame path is formed between the rod end bearing and the casing.

14. An actuator assembly, comprising;
a housing having an inner cavity and at least one exit path providing an explosion-roof flame path;
a motor disposed within the housing;
motor control electronics communicating with the motor and disposed within the housing; and
an actuator carried by the housing and communicating with the motor, the actuator carried for movement relative to the housing responsive to actuation of the motor;
wherein the housing includes a clevis that is removably secured to a motor cover of the housing, and wherein an explosion-proof flame path is formed between the clevis and the motor cover.

15. The assembly of claim 14 wherein the housing includes an actuator/motor casing, wherein the motor cover is removably secured to the actuator/motor casing, and wherein another flame path is provided between the motor cover and the casing.

16. The assembly of claim 15 wherein the another flame path comprises a spigot joint.

17. The assembly of claim 14 wherein the flame path comprises a spigot joint.

18. An actuator assembly, comprising:
a housing having an inner cavity and at least one exit path providing an explosion-proof flame path;
a motor disposed within the housing;
motor control electronics communicating with the motor and disposed within the housing; and
an actuator carried by the housing and communicating with the motor, the actuator carried for movement relative to the housing responsive to actuation of the motor;
wherein the housing comprises an electronics tray and a cover, the cover is removably secured to the electronics tray via a plurality of fasteners, and an explosion-proof flame path is provided between the cover and the tray.

19. The assembly of claim 18 wherein the cover comprises a heat sink, and wherein electronics are mounted to an inner surface of the cover such that heat is dissipated from the electronics through the cover and outside of the housing.

20. The assembly of claim 19 wherein the electronics comprises a printed circuit driver board and a printed circuit digital logic board affixed to the cover via conductive fasteners.

21. The assembly of claim 18 wherein the cover comprises at least one wire feed through fitting mounted to the cover, and wherein a threaded explosion-proof flame path is formed between the wire feed through fitting and the cover.

22. An explosion-proof actuator assembly, comprising:
an explosion-proof housing having at least one inner cavity and at least one exit path comprising an explosion-proof flame path;
a motor disposed within the housing;
motor control electronics communicating with the motor and disposed within the housing; and
an actuator carried by the housing, communicating with the motor, and operative to generate movement externally of the housing responsive to actuation of the motor.

23. The actuator assembly of claim 22 wherein the actuator comprises a linear actuator communicating with the motor, and configured to impart linear movement relative to the housing responsive to actuation of the motor.

24. The actuator assembly of claim 22 wherein the housing comprises a cover that is affixed to a portion of the housing via fasteners, and wherein the explosion-proof flame path is provided between the cover and the portion of the housing.

25. The actuator assembly of claim 24 wherein the cover comprises a heat sink cover, the portion of the housing comprises an electronics tray, and the motor control electronics are carried by the cover between the cover and the electronics tray.

26. The actuator assembly of claim 24 wherein the cover comprises a motor cover, the portion of the housing comprises an actuator/motor casing, and the motor and at least a portion of the linear actuator are carried between the motor cover and the actuator/motor casing.

27. The actuator assembly of claim 26 further comprising a clevis affixed to the motor cover, wherein another explosion-proof flame path is provided between the clevis and the motor cover.

28. The actuator assembly of claim 22 further comprising a wire feed through fitting mounted to housing, wherein the explosion-proof flame path comprises a threaded joint formed between the fitting and the housing.

29. The actuator assembly of claim 28 wherein the actuator comprises a ball/screw actuator having an actuator rod and a rod guide, the rod guide is affixed to the housing via a plurality of fasteners, and the explosion-proof flame path is provided between the rod guide and the housing.

30. The actuator assembly of claim 22 wherein the actuator includes an actuator rod extending through the housing, and wherein the explosion-proof flame path is formed between the actuator rod and the housing.

31. The actuator assembly of claim 30 wherein the housing includes a rod end bearing having a scrapper/seal formed between the actuator rod and the rod end bearing, and wherein the flame path is formed between the actuator rod and the housing internally of the scrapper/seal.

32. The actuator assembly of claim 22 wherein every penetration of the housing comprises an explosion-proof flame path.

* * * * *

UNITED STATES PATENT AND TRADEMARK OFFICE
CERTIFICATE OF CORRECTION

PATENT NO. : 6,392,322 B1  
DATED : May 21, 2002  
INVENTOR(S) : E. Joseph Mares et al.

Page 1 of 1

It is certified that error appears in the above-identified patent and that said Letters Patent is hereby corrected as shown below:

Column 3,
Line 54, delete "reference numeral in", and insert -- reference numeral 10 in --.

Column 6,
Line 5, delete "from aluminum:", and insert -- from aluminum --.

Column 7,
Lines 1-2, delete "clevis 6 and", and insert -- clevis 62 and --.
Line 2, delete "as describe below", and insert -- as described below --.

Column 8,
Line 62, delete "Fig. 10 an", and insert -- Fig. 10 is an --.

Column 9,
Line 32, delete "assembly 10.", and insert -- assembly 10 are shown --.

Column 12,
Line 46, delete "mounted to housing,", and insert -- mounted to the housing, --.

Signed and Sealed this

Twenty-second Day of October, 2002

Attest:

*Attesting Officer*

JAMES E. ROGAN
*Director of the United States Patent and Trademark Office*